2,967,154
Patented Jan. 3, 1961

United States Patent Office

2,967,154

CARRIER SUPPORTED DESICCANT

Henry P. Beerman, Evanston, Ill., assignor to International Minerals & Chemical Corporation, a corporation of New York No Drawing. Filed July 1, 1957, Ser. No. 668,900

13 Claims. (Cl. 252—194)

This invention relates to the preparation and composition of a novel desiccant. More particularly, this invention relates to a novel light-weight desiccant comprised of porous aggregates of expanded perlite and clay impregnated with a hygroscopic material.

Various solid desiccants, including materials such as silica gel, activated alumina, lithium chloride, and calcium chloride, have been used heretofore for the drying of gases and the like. Generally, solid desiccants have one or more of the following disadvantages. One disadvantage is that the high initial cost of the desiccant may prohibit its use in many commercial drying operations. Solid desiccants having a high bulk density may be undesirable because they must be supported in drying towers and the like by heavy and expensive materials of construction. Another disadvantage is that the desiccant may lose its water absorption power after frequent regeneration and repeated use. Solid desiccants such as calcium chloride and lithium chloride dissolve in water to form aqueous solutions. These aqueous solutions may be undesirable in commercial drying operations from the standpoint of handling and regeneration.

It is an object of the present invention to overcome many of the disadvantages inherent in the use of previously known solid desiccants.

It is another object of the invention to provide a novel light-weight desiccant having the ability to absorb a relatively high percentage of water with respect to its own weight.

Another object of the invention is to provide an improved desiccant which may be repeatedly regenerated at relatively low temperatures without substantial loss of water absorption powers.

Still another object of the invention is to provide a method of preparing a novel light-weight desiccant having improved water absorption properties.

These and other objects and advantages of the invention will appear in the following detailed description thereof.

It has been discovered that an improved light-weight desiccant can be prepared by heating a mixture of expanded perlite preferably of a small particle size, clay and water to form solid porous aggregates, and impregnating said aggregates with a hygroscopic material.

Expanded perlite material is preferably particles of between about 5 and 150 microns size but coarser or finer particles can be used if desired. Fines are produced in the various perlite expansion or "popping" processes producing light weight aggregates, filter aids and the like. For example, perlite ore may be crushed to pass through a screen of about 4 mesh and sized at about 45 mesh to recover two separate size fractions. The —4 +45 mesh perlite particles are heated to a temperature between about 1500° F. and about 2100° F. to produce expanded or "popped" perlite aggregates. Expansion of perlite is carried out in a vertical shaft furnace or other type of expansion furnace used by the perlite industry. A considerable amount of fines are produced in the expansion step. Expanded perlite fines are separated from the expanded perlite aggregates by air classification or the like, and stored for use as a component of the novel desiccant. The coarser expanded perlite aggregates are suitable for use as an aggregate in plaster and concrete.

On the other hand, in the production of filter aid, the —45 mesh perlite from the above-mentioned sizing step is expanded as described above. Expanded perlite from the furnace may be comminuted and sized by air classification at about 50 microns. Coarse comminuted expanded perlite from this sizing step is suitable for use as a filter aid. Finely expanded comminuted perlite from this sizing step, having a particle size on the order of about 5 to about 150 microns is suitable for use as a component of the novel desiccant.

While two methods of preparing expanded perlite fines have been described, expanded perlite fines prepared by other processes may also be used as a component of the novel desiccant.

Clay is used as a binder in the preparation of the novel desiccant. Any type of clay may be used but it is preferred to use a bentonite clay. More preferably, a swelling type bentonite clay such as is found in Wyoming and South Dakota is used.

Expanded perlite, clay, and water are mixed in a suitable apparatus such as a ribbon blender or the like to form a substantially homogeneous mixture. Sufficient expanded perlite is aded to the mixture to provide between about 2 and about 19 parts and preferably between about 4 and about 9 parts by weight of perlite per part of clay. Greater or lesser amounts of perlite in the mixture is undesirable since an excess of perlite may substantially reduce the compression strength of the aggregates produced from the mixture and a deficiency of perlite may substantially reduce the porosity of the aggregates.

Water is mixed with the expanded perlite and clay in an amount between about 40% and about 75% by weight of the mixture. However, greater or lesser amounts of water may be used if desired, depending upon whether the mixture is to be formed into discrete particles by granulation, extrusion, and the like, or whether the mixture is to be formed into pellets, discs, slabs and the like. Water content should be kept at the minimum amount necessary to accomplish the particular step used in order to minimize the heat requirements in the subsequent firing step.

In a preferred embodiment of the invention, expanded perlite and swelling type bentonite clay in a weight ratio of between about 4:1 and about 9:1 are mixed with water in an amount equivalent to between about 60% and about 70% by weight of the mixture. Discrete particles are formed by tumbling the mixture in a rotating cylinder or by extruding through openings of the desired dimensions in a suitable extrusion apparatus. Discrete particles which will pass through about a 3 mesh screen and will be retained on about a 16 mesh screen are suitable for preparing desiccants used in drying towers and the like. However, larger or smaller particles may be prepared.

As an alternative, slabs are prepared by spreading the mixture onto trays or pans.

In another embodiment of the invention, expanded perlite and swelling type bentonite clay in a weight ratio of between about 4:1 and about 9:1 are mixed with water in an amount equivalent to between about 40% and about 65% by weight of the mixture. The mixture may be pressed into discs having a diameter greater than about 2 inches.

After the mixture of expanded perlite, clay, and water is formed into desired shapes by one of the above-mentioned procedures, the mixture is fired in a suitable furance such as a rotary kiln, tunnel kiln, or the like. The mixture is heated to a temperature between about 825° C.

and about 950° C., and preferably between about 850° C. and about 900° C. to vaporize water present in the mixture and to form solid porous aggregates of expanded perlite and clay. Temperatures below about 825° C. are undesirable since aggregates formed at this temperature may have a low compression strength. At temperatures above about 950° C. the porosity of the aggregates may be substantially reduced.

In a preferred embodiment of the invention, discrete particles of the mxture having a mesh size of about —4 +16 mesh are introduced into a gas or oil fired rotary kiln in countercurrent flow with combustion gases. The average temperature of the porous aggregates discharged from the kiln is between about 850° C. and about 900° C.

The time necessary to heat the mixture to the desired temperature will vary with the type of furnace and the size of the particles being heated. For example, when the mixture is formed into a slab having a thickness of about ½ inch, and the slab is placed in an electric furnace heated to a temperature of about 875° C., about 20 minutes is required for the slab to reach a temperature equilibrium. However, substantially less time is required for discrete particles of the mixture to reach this temperature in the same furnace.

After the porous aggregates are removed from the kiln they may be cooled in an air cooler or other suitable cooling apparatus. When porous aggregates are produced in slab form, they may be cut into desired shapes or crushed and comminuted to form aggregates having a particle size suitable for use in drying towers and the like. Oversize particles obtained by comminuting the porous slabs may be recycled to the comminuting step and undersize particles may be recycled to the initial mixing step.

Solid porous aggregates of expanded perlite and clay, in the form of discrete particles or slabs, as the case may be, are saturated with an aqueous solution of a hygroscopic material. Any hygroscopic material which is soluble in water and which will not vaporize at temperatures between about 100° C. and 200° C. may be used. It is preferred to use an aqueous solution of lithium chloride or calcium chloride, but glycerol and an ethylene glycol such as diethylene glycol and triethylene glycol may also be used. Aqueous solutions of phosphoric acid, sulfuric acid, sodium hydroxide and potassium hydroxide may also be used to prepare the novel desiccant. However, the use of strong acids and strong bases such as these is not desirable since these materials react with the porous aggregates and cause deterioration of the aggregates after repeated use and regeneration. In addition, strong bases and strong acids may have a corrosive effect upon the containers used to hold the desiccant during the drying operation. Mixtures of two or more hygroscopic materials in aqueuos solution may also be used to saturate the porous aggregates.

An aqueous solution containing between about 5% and about 40% and preferably between about 10% and about 30% by weight of hygroscopic material is used to prepare the novel desiccant. Hygroscopic material is preferably sprayed onto a tumbling bed of porous aggregates to saturate the pores thereof. If desired, porous aggregates may be immersed in the solution of hygroscopic material until the pores are saturated. Porous aggregates are contacted with sufficient solution of hygroscopic material by spraying, immersing, and the like, to provide between about 1 and about 19 parts, and preferably between about 2 and about 9 parts of porous aggregate per part of hygroscopic material on a water-free basis.

Porous aggregates saturated with an aqueous solution of hygroscopic material are heated to a temperature in excess of about 150° C. to evaporate the major portion of the water present and to form the novel desiccant. Temperatures of about 200° C. may be necessary to remove a major portion of the water when lithium chloride is the hygroscopic material. It is necessary to use a vacuum of about 20 mm of mercury and a temperature of about 180° C. when drying desiccants containing glycerol.

When a novel desiccant of this type is contacted with moist gases, a substantial amount of water is absorbed from the gases per unit of weight of novel desiccant. The novel desiccant prepared in accordance with this invention has a bulk weight of the order of about 20 to 25 pounds per cubic foot. A substantial reduction in the cost of drying tower equipment may be realized when the novel light-weight desiccant is used, since expensive and heavy materials of construction are not necessary.

As illustrative of the character of the instant invention, but in no way intended to be limited thereby, the following examples are described. All parts and percentages are by weight unless otherwise indicated.

EXAMPLE I

About 85 parts of expanded comminuted perlite having a particle size of between about 5 and 20 microns and about 15 parts of swelling type bentonite obtained from the area in the vicinity of Belle Fourche, South Dakota, were mixed with about 175 parts of water to form a substantially homogeneous plastic mass. The mass was placed in a quartz tray and heated at a temperature of about 110° C. for about 2 hours until substantially free of moisture. The tray containing expanded perlite and bentonite clay was then placed in an electric furnace and heated to a temperature of about 850° C. where it was held for about 20 minutes to produce a slab of porous aggregate. The porous aggregate was allowed to cool to room temperature and was crushed and screened to pass through a No. 4 mesh screen and be retained on an 8 mesh screen. About 10 parts of the —4 +8 mesh porous aggregates were blended with about 3.33 parts of lithium chloride in the form of an aqueous solution containing about 30% lithium chloride by weight. Sufficient lithium chloride was present in the solution to produce a solid desiccant containing about 25% by weight of lithium chloride. The porous aggregates saturated with lithium chloride solution were heated to a temperature of about 200° C. for about 10 hours until substantially free of water. After cooling the solid desiccant was weighed and placed into a controlled humidity room having a relative humidity of about 50% at 72° F. After about 6 hours the weight of the solid desiccant was increased about 21%. After about 24 hours of exposure to this atmosphere, the weight of the solid desiccant was increased about 50%, increasing to the theoretical maximum of 70% total absorption in 48 hours.

EXAMPLE II

Solid desiccant materials prepared as in Example I were placed into a controlled humidity room having a relative humidity of about 25% to 72° F. After about 6 hours' exposure to this atmosphere, the weight of the solid desiccant was increased by about 12% and after 24 hours it was increased to about 30%, rising to the theoretical maximum of 45% total absorption within 72 hours.

EXAMPLE III

The procedure of Example I was repeated with the exception that about 1.11 parts of lithium chloride in the form of an aqueous solution containing about 10% by weight of lithium chloride were blended with the porous aggregates. This amount of lithium chloride was sufficient to produce a solid desiccant containing about 10% lithium chloride by weight. The solid desiccant prepared in this manner was exposed to relative humidities of 50% and 25% as in Examples I and II. After an exposure of about 6 hours to a relative humidity of about 50% the weight of the desiccant increased by about 13% and after about 24 hours the weight increased by about 17%, rising to about 21% in 48 hours. When exposed to a relative humidity of about 25% for about 6 hours, the weight of the desiccant increased by about 9%, and after about 24 hours the weight was increased by about 12%.

EXAMPLE IV

The procedure of Example I was repeated with the exception that instead of adding an aqueous lithium chloride solution to the porous aggregates, an aqueous calcium chloride solution containing about 30% by weight of calcium chloride was used. Sufficient solution was added to the porous aggregates to provide about 3.33 parts of calcium chloride per 10 parts of porous aggregate. The desiccant prepared in this manner contained about 25% by weight of calcium chloride. After exposure to relative humidity of about 50% for about 6 hours, the weight of the dessicant increased by about 17%, and after about 24 hours exposure, the weight of the dessicant increased by about 39%, rising to the theoretical maximum absorption of 45% in 48 hours. When the dessicant was exposed to the relative humidity of 25% for about 6 hours, the weight of the desiccant increased by about 11% and after about 24 hours, the weight of the desiccant increased by about 23% (the theoretical maximum absorption at equilibrium being about 25%).

EXAMPLE V

For purposes of comparison, two samples of silica gel having a particle sizing of —2 +6 mm., were exposed to 50% and 25% relative humidity atmospheres respectively as described in Examples I and II. After about 6 hours exposure to a relative humidity of about 50%, the weight of the silica gel increased by about 16%, and after about 24 hours, the weight increased by about 26%. After exposure to a relative humidity of about 25% for 6 hours, the weight of the silica gel increased by about 11% and after about 24 hours, the weight increased by about 16%.

EXAMPLE VI

Novel desiccant prepared as in Example I was separated into various mesh sizes of respectively —¼" +4, —4 +6, —6 +8, —8 +10, —10 +12, —12 +14 mesh fractions. Each fraction was subjected to a relative humidity of about 60% at 72° F. The average water content of the various sizes of novel desiccant in terms of percent of initial weight gained is presented in Table I.

Table I

| Time of conduct, hours: | Average percent of initial weight gained |
| --- | --- |
| 2 | 10 |
| 4 | 19 |
| 6 | 26 |
| 8 | 33 |
| 24 | 62 |
| 48 | 72 |
| 72 | 78 |

The percent weight gain of each fraction was within —1 +2% of the average showing that variation of particle size between —¼" to 14 mesh had no effect on the moisture absorption rate.

The "theoretical maximum absorption" referred to in the examples was calculated from Figure 71, "Equilibrium Moisture of Liquid and Solid Desiccants," page 878, Chemical Engineers' Handbook, Perry, Third Edition, McGraw-Hill Book Company, Inc.

Having thus fully described and illustrated the invention what is desired to be secured by Letters Patent is:

1. A desiccant comprising a porous carrier and a hygroscopic material on the surface of said carrier, there being present in said desiccant from about one to about nineteen parts by weight of said carrier per part by weight of said hygroscopic material, said porous carrier consisting essentially of a fired body formed from a mixture of clay and particulate expanded perlite, there being present in said body from about two to about nineteen parts by weight of said particulate perlite per part by weight of said clay.

2. A desiccant as defined in claim 1 wherein the particulate expanded perlite in said body has a particle size of from about five to about one hundred fifty microns.

3. A desiccant as defined in claim 1 having bulk weight of about twenty to about twenty-five pounds per cubic foot.

4. A desiccant as defined in claim 1 wherein said clay is bentonite.

5. A desiccant as defined in claim 1 wherein the hygroscopic material is lithium chloride.

6. A desiccant as defined in claim 1 wherein the hygroscopic material is calcium chloride.

7. A desiccant as defined in claim 1 wherein the hygroscopic material is ethylene glycol.

8. A method of preparing a desiccant which comprises forming a mixture consisting essentially of clay, particulate expanded perlite and water, there being present in said mixture from about two to about nineteen parts by weight of said particulate perlite per part by weight of said clay and sufficient water to render said mixture moldable, heating said mixture to a temperature of between about 825° C. and about 950° C. to form a rigid, porous, fired body, applying to the surface of said fired body an aqueous solution of a hygroscopic material in an amount requisite to provide a dried desiccant containing from about one to about nineteen parts by weight of said body per part by weight of hygroscopic material on a dry basis and thereafter substantially completely removing water from said solution on the surface of said body.

9. The method of claim 8 wherein said expanded perlite has a particle size of from about 5 to about 150 microns.

10. The method of claim 8 wherein said clay is bentonite.

11. The method of claim 8 wherein said hygroscopic material is lithium chloride.

12. The method of claim 8 wherein said hyroscopic material is calcium chloride.

13. The method of claim 8 wherein said hygroscopic material is ethylene glycol.

References Cited in the file of this patent

UNITED STATES PATENTS

| | | |
| --- | --- | --- |
| 1,614,753 | Moyer | Jan. 18, 1927 |
| 1,633,959 | Smolczyk | June 28, 1927 |
| 1,798,862 | Baker | Mar. 31, 1931 |
| 1,812,376 | Ross et al. | June 30, 1931 |
| 1,874,949 | Harvey | Aug. 30, 1932 |
| 2,203,144 | Hammond | June 4, 1940 |
| 2,232,728 | Pleasants | Feb. 25, 1941 |
| 2,356,890 | Schulze | Aug. 29, 1944 |
| 2,388,060 | Hicks | Oct. 30, 1945 |
| 2,585,366 | Bollaert et al. | Feb. 12, 1952 |
| 2,626,864 | Miscall et al. | Jan. 27, 1953 |
| 2,728,733 | Hashimoto | Dec. 27, 1955 |
| 2,885,746 | Gura | May 12, 1959 |

FOREIGN PATENTS

| | | |
| --- | --- | --- |
| 259,574 | Germany | Apr. 25, 1913 |

OTHER REFERENCES

Yoe et al.: Ind. and Eng. Chem., June 1928, pages 656, 657.